United States Patent [19]
Kleykamp et al.

[11] 4,289,077
[45] Sep. 15, 1981

[54] RAILWAY CENTER BEARING WEAR LINER

[75] Inventors: Donald L. Kleykamp, Springboro, Ohio; Homer N. Holden, Sylva, N.C.

[73] Assignee: Dayco Corporation, Dayton, Ohio

[21] Appl. No.: 42,256

[22] Filed: May 24, 1979

[51] Int. Cl.³ ............... B61F 5/16; F16C 17/04; F16C 17/10
[52] U.S. Cl. .................. 105/199 C; 105/189; 308/137
[58] Field of Search ............... 105/199 C, 189; 308/137

[56] References Cited

U.S. PATENT DOCUMENTS

| | | | |
|---|---|---|---|
| 2,258,640 | 10/1941 | Beckette | 105/199 C X |
| 2,514,034 | 7/1950 | Dean | 105/199 C |
| 3,218,989 | 11/1965 | Kreiner et al. | 105/199 C X |
| 3,944,298 | 3/1976 | Cannon | 308/137 |
| 4,075,951 | 2/1978 | Chierici et al. | 105/199 C |
| 4,188,888 | 2/1980 | Cooper et al | 105/199 C |
| 4,239,007 | 12/1980 | Kleykamp et al. | 105/225 |

*Primary Examiner*—Joseph F. Peters, Jr.
*Assistant Examiner*—Howard Beltran
*Attorney, Agent, or Firm*—Charles E. Bricker

[57] ABSTRACT

A cup-shaped wear resistant liner for a center plate structure of a railway vehicle is provided wherein such liner is defined by a planar disc-like bottom portion adjoined by a peripheral flange portion extending from the periphery of the bottom portion with each of the portions being made primarily of a polymeric material wherein one of the portions has a particular wear characteristic and the other of the portions has a wear characteristic that is different from the wear characteristic of the one portion.

10 Claims, 12 Drawing Figures

RAILWAY CENTER BEARING WEAR LINER

BACKGROUND OF THE INVENTION

1. Field of the Invention

This invention relates to railway vehicles and in particular to wear resistant liners for center plate structures thereof.

2. Prior Art Statement

It is known in the art to provide a wear member or liner for center plate structure of a railway vehicle made of a particular polymeric material having reinforcing material embedded therein and as disclosed in U.S. Pat. No. 4,188,888.

It is also known to provide a bowl shaped liner for center plate structure wherein such liner consists of a disc portion and an adjoining flange portion made of a separate segmented strip and as disclosed in U.S. Pat. No. 4,075,951.

It has also been proposed in U.S. patent application Ser. No. 30,036, now U.S. Pat. No. 4,239,007, issued Dec. 16, 1980 to provide a roughly U-shaped pedestal liner having a bight and a pair of parallel legs and such liner is for disposal between an associated pedestal leg and journal box of a railway pedestal truck wherein the pedestal liner has a continuous uninterrupted backing material defining its bight and parallel legs, a first antifriction material for the bight fixed against the backing material, a second antifriction material for the parallel legs also fixed against the backing material, and with the first and second antifriction materials having different wear characteristics compatible with the different wear rates to which they are subjected.

SUMMARY

It is a feature of this invention to provide a cup-shaped wear resistant liner for a center plate structure of a railway vehicle defined by a planar disc-like bottom portion adjoined by a peripheral flange portion extending from the periphery of the bottom portion with each of the portions being made primarily of a polymeric material wherein one of the portions has a particular wear characteristic and the other of the portions has a wear characteristic that is different from the wear characteristic of the one portion.

Another feature of this invention is to provide a liner of the character mentioned in which one of the portions thereof is made of an ultra high molecular weight polymeric material.

Another feature of this invention is to provide a liner of the character mentioned in which one of the portions is made of an ultra high molecular weight polyethylene and the other portion thereof is made of nylon.

Another feature of this invention is to provide a liner of the character mentioned in which at least one of the portions thereof has reinforcing means embedded in the polymeric material thereof and such polymeric material serves as a matrix for and substantially completely surrounds the reinforcing means.

Another feature of this invention is to provide a liner of the character mentioned in which the reinforcing means comprises a metal structure.

Another feature of this invention is to provide a liner of the character mentioned in which the ultra high molecular weight polymeric material is an ultra high molecular weight polyethylene having a preferred molecular weight in the range of 3 to 6 million.

Another feature of this invention is to provide an improved method of making a cup-shaped wear resistant liner for a center plate structure of a railway vehicle of the character mentioned.

Another feature of this invention is to provide a method of making a liner of the character mentioned comprising the steps of forming the liner consisting of a planar disc-like bottom portion adjoined by a peripheral flange portion extending from the periphery of the bottom portion with each of the portions being made primarily of a polymeric material wherein such forming steps comprise the steps of, forming one of the portions of a first polymeric material having a particular wear characteristic, and forming the other of the portions of a second polymeric material having a wear characteristic that is different from the wear characteristic of the first polymeric material.

Therefore, it is an object of this invention to provide an improved liner and method of making same having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
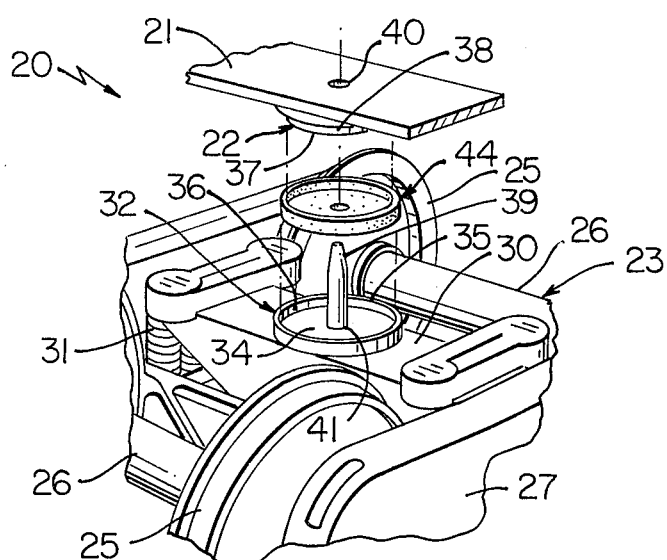
FIG. 1 is a perspective view with parts exploded, parts broken away, and parts in cross section of a fragmentary portion of one end of a railway vehicle including part of an exemplary truck and certain associated components and particularly showing a part of a vehicle body bolster and its center plate, a truck bolster and its center plate, a center pin disposed between such center plates, and an exemplary embodiment of a cup-shaped wear resistant liner of this invention disposed between the center plates.

Reference is now made to FIG. 1 of the drawings which illustrates an end portion of an exemplary railway vehicle which may be a railway car which is designated generally by the reference numeral 20. The car 20 has a car body (not shown) and a pair of body bolsters at opposite ends thereof with only one bolster 21 being shown. Each body bolster 21 has a body center plate 22 of a type known in the art and the entire load of one end of the car body is carried through a body center plate 22 to an associated car truck 23 whereby the entire load of a railway car body is carried through the body center plates 22 to car trucks 23 at opposite ends of the car body.

Each truck 23 comprises the usual plurality of four wheels 25 and an axle 26 extends between each pair of wheels 25. Each truck 23 has a structural frame assembly 27 carried by the axles 26 and such axles 26 are freely rotatable while carrying the frame assembly 27. The frame assembly 27 carries a truck bolster 30 employing suitable resilient mounting devices, shown as compression spring sets 31, at opposite sides of the truck 23.

The truck bolster 30 is comprised of a truck bolster bowl 32 (also see FIG. 2) and the truck bolster bowl 32 is defined as an integral part of the truck bolster 30 using techniques which are known in the art. The truck bolster bowl 32 comprises a planar truck center plate 34 which has an upstanding peripheral flange 35 which has a right circular cylindrical inside surface 36. The car body center plate 22 has a bottom surface 37 (FIG. 2) adjoined by a cylindrical outside surface 38 and the center plate 22 is adapted to be received within the right circular cylindrical inside surface 36 of the flange 35 whereby the body center plate 22 is supported by the truck center plate 34 and the entire load of the railway car 20 (horizontal and vertical) is carried by the center plates 22 and 34.

The railway car 20 has a center pin 39 associated with each truck 23 and each pin is also referred to in the art as a king bolt 39. The upper portion of each center pin 39 extends through an opening or bore 40 which extends through the body center plate 22 and continues into the body bolster 21. The bottom portion of each center pin 39 extends into an opening or bore 41 which extends through the truck center plate 34 and continues into the truck bolster 30. Each truck 23 turns about its associated center pin 39 which serves as a safety pin; however, the loads of the railway car body are taken by the center plates 22 and 34.

The construction and arrangement of each truck center plate 34 and its associated car body center plate 22 is such that the vertical load at one end of a railway car 20 is carried by the horizontal planar surface of the truck center plate 34 and the bottom planar surface 37 of the car body center plate 22. It has been found that the vertical load carried by plate 34 and surface 37 is substantially greater than the horizontal load exerted between the right circular cylindrical inside surface 36 of the flange 35 of the truck center plate 34 and the cylindrical outside surface 38 of the body center plate 22. Accordingly, this invention teaches the provision of a cup-shaped wear resistant center plate liner for use between components 22 and 34 which is designated generally by the reference numeral 44 and is shown in perspective in FIG. 1. The liner 44 takes the different loads into account.

Figure 2:
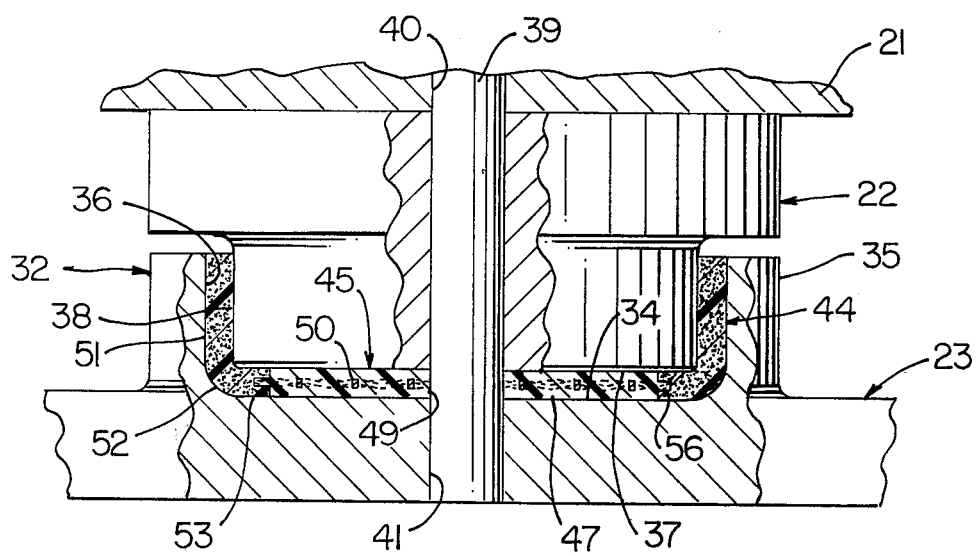
FIG. 2 is an enlarged view with parts in cross section, parts in elevation, and parts broken away of the cup-shaped liner of FIG. 1 and its associated center plate structures positioned for normal operation and illustrating a planar disc-like bottom portion thereof adjoined by a peripheral flange portion.
Figure 3:
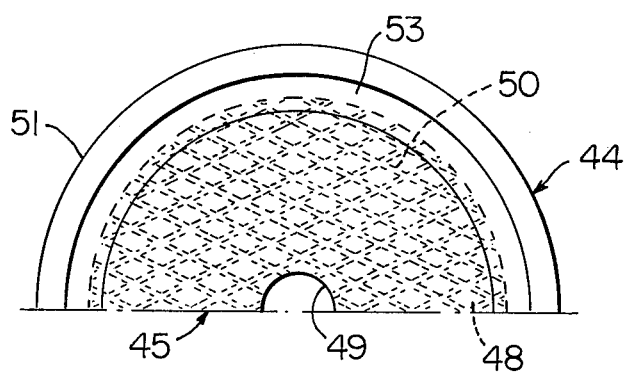
FIG. 3 is a plan view looking perpendicularly into the open end of one-half of the liner of FIG. 2 and illustrating with dotted lines reinforcing means embedded in the planar disc-like bottom portion.
Figure 4:
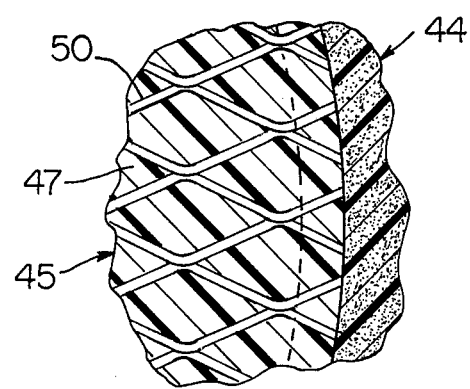
FIG. 4 is an enlarged fragmentary view with parts in cross section and parts broken away particularly illustrating the area in which the outer periphery of the disc-like bottom portion adjoins the peripheral flange portion.

As best seen in FIGS. 2 and 3, the liner 44 has a disc-like bottom portion 45 adjoined by a tubular peripheral flange portion which is designated generally by the reference numeral 46 and portion 46 extends upwardly from the periphery of the bottom portion 45. Each of the portions 45 and 46 is made primarily of polymeric material; however, one of the portions has a particular wear characteristic and the other portion has a wear characteristic which is different from the wear characteristic of the one portion.

As indicated earlier, the greatest load is exerted between the truck center plate 34 and the surface 37 of the body center plate 22 whereby the greatest wear occurs at this location. In view of this, the disc-like bottom portion 45 of the liner 44 is made such that it has a substantially better wear characteristic, i.e., it is more resistant to wear, than the peripheral flange portion 46 of such liner. Accordingly, the disc-like bottom portion 45 is made of a ultra high molecular weight polymeric material, preferably polyethylene. The molecular weight of the polyethylene comprising the bottom portion is at least 2 million and preferably such molecular weight is in the preferred range of 2 to 5 million.

Because the wear characteristic of the peripheral flange portion 46 need not be as great as the bottom portion 45, the peripheral flange portion 46 may be made of material which is comparatively less wear resistant than portion 45. In this example the peripheral flange portion 46 may be made of a different polymeric material such as nylon, for example.

The disc-like bottom portion 45 of the liner 44 is made primarily of a polymeric material in the form of high molecular weight polyethylene, as previously mentioned, which is designated by the reference numeral 47. The polymeric material 47 has reinforcing means in the form of a metal structure 50 suitably embedded therein and in this example of the invention the metal structure 50 is in the form of an expanded metal structure having roughly diamond-shaped openings 48 therein, FIG. 3. Polymeric material 47 of the disc-like bottom portion 45 serves as a matrix for and substantially completely surrounds the metal structure 50. The bottom portion 45 also has a central opening 49 therein for receiving an associated center pin 39 therethrough.

The peripheral flange portion 46 is of L-shaped cross-sectional configuration as will be readily apparent from the drawing and comprises a right circular cylindrical part 51 (FIG. 2) disposed substantially perpendicular to the bottom portion 45 and a transition part 52 interconnecting the right circular cylindrical part 51 and the disc-like bottom portion 45. The transition part 52 has an annular portion 53 of comparatively small radial extension interconnecting the transition part 52 and hence the flange portion 46 and the disc-like bottom portion 45.

Having described the basic structure of the center plate liner 44, reference is now made to FIGS. 5 through 9 which illustrate method steps which may be employed in making such liner. In making the liner 44 in accordance with the method of this invention the disc-like bottom portion 45 and peripheral flange portion 46 are made substantially independently of each other, i.e., each of these portions is made in a different mold device, mold portion, or the like. The method steps include the steps of fixing the disc-like bottom portion 45 and peripheral portion 46 together as a unitary structure.

Figure 5:
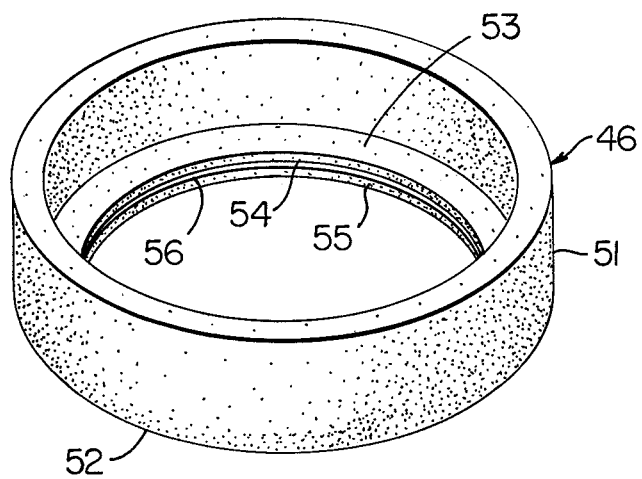
FIG. 5 is a perspective view of a peripheral flange portion of the liner of FIG. 2 showing an annular groove therein.
Figure 7:
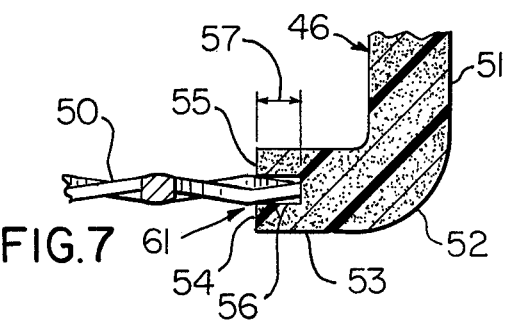
FIG. 7 is a fragmentary view with parts in cross section and parts in elevation taken essentially on the line 7—7 of FIG. 6.

The peripheral flange portion 46 may be made utilizing any suitable technique or apparatus known in the art and such portion 46 is illustrated in FIG. 5 and is preferably made by casting or injection molding. During the forming of portion 46, the transition part 52 is formed simultaneously with the right circular cylindrical part 51 which is disposed perpendicular to an annular portion 53 of the transition part. The transition portion 53 terminates in an inner exposed edge 54 defined by a vertically disposed right circular cylindrical surface 55. During the forming of the peripheral flange portion 46, an annular groove 56 is defined therein which extends radially outwardly from the right circular cylindrical surface 55 into the transition portion 52 by a distance 57 as illustrated in FIG. 7.

In the embodiment of the method illustrated in FIGS. 5-9, the peripheral flange portion 46 is formed first followed by forming the planar disc-like portion 45. The disc-like portion 45 is formed in position with a radial extension 60 (FIG. 9) disposed within the annular groove 56 to define the liner 44 as a substantially unitary structure.

Figure 6:
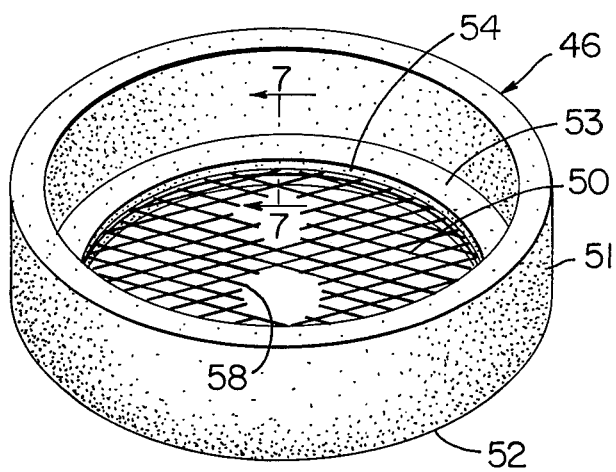
FIG. 6 is a view similar to FIG. 5 showing a reinforcing metal structure disposed within the annular groove in the peripheral flange portion prior to molding the remainder of the disc-like bottom portion on opposite sides of the reinforcing metal structure to define the completed liner of FIG. 2.
Figure 8:
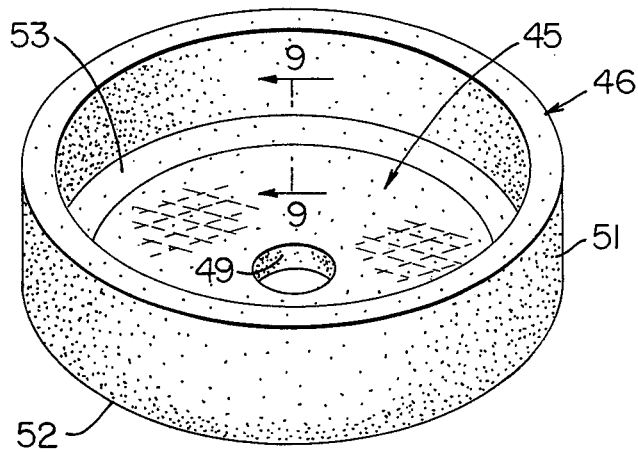
FIG. 8 is a perspective view of the liner of FIG. 2 after molding polymeric material on opposite sides of the reinforcing metal structure.
Figure 9:
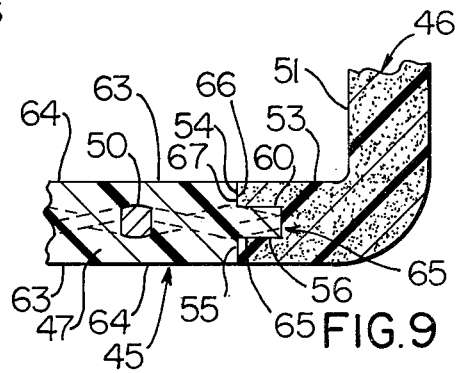
FIG. 9 is an enlarged fragmentary cross-sectional view taken essentially on the line 9—9 of FIG. 8.

The forming of the disc-like bottom portion 45 in this example comprises providing the reinforcing means or metal structure 50 as an expanded metal structure and cutting same to define a substantially circular outline therein and a hole 58 in the center thereof, FIG. 6. The structure 50 is then disposed so that its peripheral edge extends within the annular groove 56 and as illustrated at 61 in FIG. 7. With the reinforcing structure 50 disposed within the groove 56 a suitable mold device, or the like, of any suitable type known in the art is employed and polymeric material 47 (preferably in the form of high molecular weight polyethylene) is introduced into the mold device so that it sandwiches the reinforcing metal structure 50 between opposite side portions 63 and 64 (FIG. 9) thereof while flowing as shown at 65 within the groove 56. This action provides a bonding connection between the disc-like bottom portion 45 and the peripheral flange portion 46 while defining an interface at 67 between the right circular cylindrical surface 55 and a cooperating surface 66 of the peripheral portion 46 produced upon molding portion 46.

Figure 11:
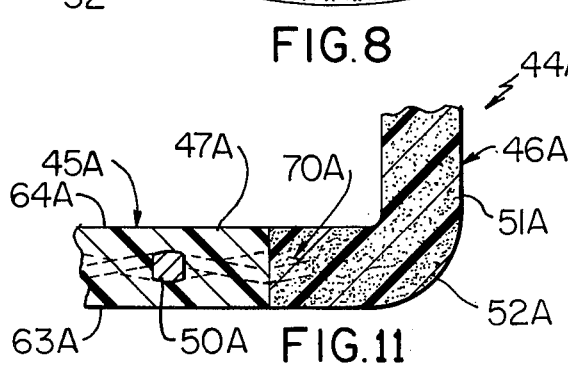
FIG. 11 is an enlarged fragmentary cross-sectional view similar to FIG. 9 of a typical liner which may be made using the structure of FIG. 10.
Figure 10:
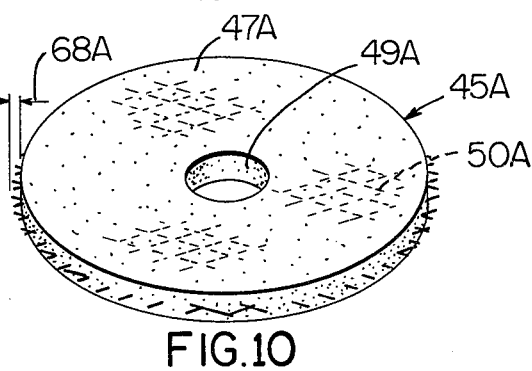
FIG. 10 is a perspective view illustrating the first of another series of method steps which may be employed in defining the liner of FIG. 2 by first forming a planar disc-like bottom portion having reinforcing means embedded between top and bottom portions of polymeric material and having an extension of the reinforcing means extending radially outwardly therefrom for use in interconnecting a peripheral flange portion thereto by molding such peripheral flange portion around and to the structure of FIG. 10.

Another exemplary embodiment of the center plate liner of this invention is illustrated in FIGS. 10 and 11 of the drawing. The liner illustrated in FIGS. 10 and 11 is similar to the liner 44; therefore, such liner will be designated by the reference numeral 44A and representative parts of such liner which are similar to corresponding parts of the liner 44 will be designated in the drawings by the same reference numeral as in the liner 44 (whether or not such representative parts are mentioned in the specification) followed by the letter designation A and not described again in detail. Only those component parts of the liner 44A which are different from corresponding parts of the liner 44 will be designated by a new reference numeral also followed by the letter designation A and not described again in detail.

The main difference between the liner 44A and the liner 44 is that in the liner 44A the disc-like bottom portion 45A is made first and in a substantially independent manner followed by forming the peripheral flange portion 46A therearound. In particular, in forming the disc-like bottom portion 45A reinforcing means in the form of reinforcing metal structure 50A is formed of circular outline and with a central opening 58A therein. The structure 50A is then placed in an associated mold device, or the like, so as to define the main part of the disc-like bottom portion 45A. During this forming or molding action the central opening 49A is formed in portion 45A together with portions 63A and 64A (FIG. 11) thereof.

The structure 50A has a radial extension 68A which extends outwardly of the polymeric material 47A defining the bottom portion 45A and such polymeric material serves as a matrix for reinforcing structure 50A in a similar manner as previously described; and, the resulting structure is illustrated in FIG. 10. A suitable mold device is then provided and the peripheral flange portion 46A, with its right circular cylindrical part 51A and transition part 52A, is made in position around the structure of FIG. 10. During the process of forming the peripheral flange portion 46A, polymeric material defining the peripheral flange portion flows through and completely envelopes the radial extension 68A of the reinforcing structure as illustrated at 70A in FIG. 11. In this embodiment the matrix material defining the peripheral flange portion 46A not only completes the cup-shaped configuration of the liner 44A but also serves as an integral interconnection fixing the reinforcing structure 50A directly to the polymeric matrix material defining the flange portion 46A. The polymeric material 47A comprising the disc-like bottom portion is preferably of ultra high molecular weight polyethylene of the character previously described and the polymeric material defining the peripheral flange portion 46A is preferably nylon.

Figure 12:
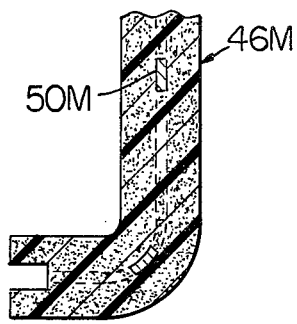
FIG. 12 is a fragmentary cross-sectional view of a peripheral flange portion provided with reinforcing means and may comprise the liner of FIG. 8 or the liner of FIG. 11.

In this disclosure the liners 44 and 44A have peripheral flange portions 46 and 46A respectively which are free of reinforcing means. However, it will be appreciated that such peripheral flange portions may also be reinforced if desired and reinforcing means may be provided in a similar manner as illustrated in FIG. 12. In particular, FIG. 12 illustrates a modification of the peripheral flange portion which is designated by the reference numeral 46M and such peripheral flange portion has reinforcing means 50M suitably embedded therein. The reinforcing means 50M may be of any suitable reinforcing material such as an expanded metal structure and in this example an expanded metal structure is provided which is substantially identical to the expanded metal structure 50 and 50A illustrated in the liners 44 and 44A; however, the expanded metal structure 50M is shown in the form of a flattened metal structure for ease of drawing presentation. The reinforced peripheral flange portion 46M may be suitably provided on either the liner 44 or 44A and used in lieu of the respective flange portions 46 or 46A.

In this disclosure of the invention, high molecular weight polyethylene has been used in the disc-like bottom portion of each liner and nylon has been used in the peripheral flange portion of each liner; however, it will be appreciated that in accordance with the teachings of this invention other materials having similar relative wear resistance characteristics may be provided. In addition, if it is found that in some applications the wear characteristics for the peripheral flange portion should be greater than the wear characteristics for the disc-like bottom portion the two materials may be interchanged.

The bottom portions 45 and 45A of the respective liners 44 and 44A have been described herein as being comprised of ultra high molecular weight polyethylene having a molecular weight of at least two million with the preferred molecular weight being in the range of 2 to 5 million. The technique for determining the molecular weight is referred to as the intrinsic viscosity test and is widely used in the United States.

In this disclosure of the invention, reference has been made to molecular weight being at least 2 million and preferably in the range of 2 to 5 million. However, it is to be understood that this reference to molecular weight means average molecular weight.

While present exemplary embodiments of this invention, and methods of practicing the same, have been illustrated and described, it will be recognized that this invention may be otherwise variously embodied and practiced within the scope of the following claims.

What is claimed is:

1. In a cup-shaped wear resistant liner for a center plate structure of a railway vehicle defined by a planar disc-like bottom portion adjoined by a tubular peripheral flange portion extending upwardly from the periphery of said bottom portion, each of said portions being made primarily of polymeric material, the improvement wherein one of said portions being made of a material having a particular wear characteristic and the other of said portions being made of a material having a wear characteristic that is different from the wear characteristic of said one portion, said portions being fixed together to define a unitary structure.

2. A liner as set forth in claim 1 in which said one portion is an ultra high molecular weight polymeric material.

3. A liner as set forth in claim 2 in which said ultra high molecular weight polymeric material is polyethylene.

4. A liner as set forth in claim 2 in which said other portion is nylon.

5. A liner as set forth in claim 4 in which said one portion is said bottom portion.

6. A liner as set forth in claim 1 in which at least one of said portions has reinforcing means embedded in the polymeric material thereof and said polymeric material serves as a matrix for and substantially completely surrounds the associated reinforcing means.

7. A liner as set forth in claim 6 in which said reinforcing means comprises a metal structure.

8. A liner as set forth in claim 6 in which said reinforcing means comprises an expanded metal structure.

9. A liner as set forth in claim 1 in which each of said portions has reinforcing means embedded in the polymeric material thereof which serves as a matrix for and substantially completely surrounds the associated reinforcing means.

10. A liner as set forth in claim 1 in which said tubular peripheral flange portion is of L-shaped cross-sectional configuration and comprises a right circular cylindrical part disposed perpendicular to said bottom portion and a transition part interconnecting said right circular cylinderical part and bottom portion.

* * * * *